(12) United States Patent
Nishiyama (10) Patent No.: US 10,726,620 B2
(45) Date of Patent: Jul. 28, 2020

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Tomohiro Nishiyama, Tama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/051,823

(22) Filed: Aug. 1, 2018

(65) Prior Publication Data

US 2019/0051045 A1 Feb. 14, 2019

(30) Foreign Application Priority Data

Aug. 14, 2017 (JP) .................................. 2017-156480
Apr. 9, 2018 (JP) .................................. 2018-074669

(51) Int. Cl.
*G06T 15/00* (2011.01)
*G06T 17/20* (2006.01)
(Continued)

(52) U.S. Cl.
CPC ............ *G06T 17/20* (2013.01); *G06T 1/0007* (2013.01); *G06T 1/20* (2013.01); *G06T 7/251* (2017.01);
(Continued)

(58) Field of Classification Search
CPC ......... G06T 19/00; G06T 17/20; G06T 17/00; G06T 15/10; G06T 15/00
(Continued)

(56) References Cited

U.S. PATENT DOCUMENTS

2001/0012379 A1* 8/2001 Amemiya ........ G08B 13/19602
382/103
2014/0071243 A1* 3/2014 Nakatsukasa .......... G01B 11/25
348/46
(Continued)

FOREIGN PATENT DOCUMENTS

JP 2001236505 A 8/2001
JP 2003271928 A 9/2003
(Continued)

OTHER PUBLICATIONS

Iwashita et al., Fast 3D Shape Reconstruction of Moving Object by Parallel Fast Level Set Method, IEICE Transactions on Information and Systems, Japan Institute of Electronics, Information and Communication Engineers, Aug. 1, 2007, vol. J90-D, No. 8, pp. 1888-1899.
(Continued)

*Primary Examiner* — Gordon G Liu
(74) *Attorney, Agent, or Firm* — Carter, DeLuca & Farrell LLP (57) ABSTRACT

The image processing apparatus of the present invention is an image processing apparatus that performs processing relating to a three-dimensional shape model generated by using a plurality of images obtained by a plurality of cameras capturing an object, and the image processing apparatus includes: a specification unit configured to specify, based on position information on an object at a first time, a processing area relating to a three-dimensional shape model of the object at a second time later than the first time; and a processing unit configured to perform processing relating to the three-dimensional shape model of the object at the second time for the processing area specified by the specification unit.

20 Claims, 9 Drawing Sheets

(51) Int. Cl.
*G06T 7/55* (2017.01)
*G06T 1/20* (2006.01)
*G06T 1/00* (2006.01)
*G06T 7/246* (2017.01)
*G06T 7/292* (2017.01)

(52) U.S. Cl.
CPC ................ *G06T 7/292* (2017.01); *G06T 7/55* (2017.01); *G06T 2207/10016* (2013.01); *G06T 2207/30196* (2013.01); *G06T 2207/30232* (2013.01); *G06T 2207/30241* (2013.01)

(58) Field of Classification Search
USPC ........................................................ 345/419
See application file for complete search history.

(56) References Cited

U.S. PATENT DOCUMENTS

| | | |
|---|---|---|
| 2017/0019654 A1 | 1/2017 | Nishiyama |
| 2018/0144485 A1 | 5/2018 | Kobayashi et al. |
| 2018/0225840 A1* | 8/2018 | Ikeda .................... H04N 5/232 |

FOREIGN PATENT DOCUMENTS

| | | |
|---|---|---|
| JP | 2014211404 A | 11/2014 |
| JP | 2015194901 A | 11/2015 |
| JP | 2016085675 A | 5/2016 |
| JP | 2017102708 A | 6/2017 |

OTHER PUBLICATIONS

Decision to Grant a Patent issued by the Japanese Patent Office on Sep. 25, 2018 in corresponding Japanese Patent Application No. 2018-074669, with English translation.

Nagase et al., "Determining Play in Soccer Scenes Using Multiple View Images," Journal of Video Information Media, vol. 60, No. 10, pp. 1664-1671, 2006, with English language abstract.

Tomiyama et al., "A Dynamic 3D, Object-Generating Algorithm from Multiple Viewpoints Using the Volume Intersection and Stereo Matching Methods," Journal of Video Information Media Society, vol. 58, No. 6, pp. 797-806, 2004, with English-language abstract.

Notice of Reasons for Refusal issued by the Japanese Patent Office dated Sep. 17, 2019 in corresponding Japanese Patent Application No. 2018-200112, with English translation.

Office Action issued by the JP Patent Office dated Apr. 7, 2020 in corresponding JP Patent Application No. 2018-200112, with English translation.

* cited by examiner

IMAGE PROCESSING APPARATUS, IMAGE PROCESSING METHOD, AND STORAGE MEDIUM

BACKGROUND OF THE INVENTION

Field of the Invention

The present invention relates to an image processing technique of an object.

Description of the Related Art

In the video image technical field, such as a sports broadcast, an image processing apparatus that assists in tracking an object has been proposed. In such tracking of an object, an object is extracted from an image obtained by capturing a moving person and position information on the extracted object is stored for each image. By referring to such position information on an object, it is possible for the image processing apparatus to acquire, for example, information on the distance traveled by a specific person. Japanese Patent Laid-Open No. 2016-085675 has described preventing a tracking error of an object based on a position relationship of objects making up a group by detecting the group of objects whose amount of change in time of the position relationship is small.

Further, a virtual viewpoint video image system generating a video image based on the position and orientation of a virtual camera is known and it is also known to generate a three-dimensional shape model of an object by using a video image captured by a plurality of cameras for generation of a virtual viewpoint video image. Regarding this point, Japanese Patent Laid-Open No. 2003-271928 has described finding an outline of a three-dimensional shape model first by Visual Hull and then finding details by using matching of a feature amount aiming at generating a three-dimensional shape model at a high speed.

SUMMARY OF THE INVENTION

However, a reduction in the amount of operation for processing an object has been insufficient so far. For example, a particle filter used in Japanese Patent Laid-Open No. 2003-271928 is a prediction method based on a probability distribution and a plurality of predicted positions is calculated for each object. Consequently, there has been a possibility that the amount of operation increases in the case where an object is tracked with a high accuracy. Further, even though a method of finding details after finding an outline of a three-dimensional shape model is adopted, the amount of operation in the case where a highly accurate three-dimensional shape model is generated has been still large.

The image processing apparatus according to the present invention is an image processing apparatus that performs processing relating to a three-dimensional shape model generated by using a plurality of images obtained by a plurality of cameras capturing an object, the image processing apparatus including: a specification unit configured to specify, based on position information on an object at a first time, a processing area relating to a three-dimensional shape model of the object at a second time later than the first time; and a processing unit configured to perform processing relating to the three-dimensional shape model of the object at the second time for the processing area specified by the specification unit.

Further features of the present invention will become apparent from the following description of exemplary embodiments with reference to the attached drawings.

DESCRIPTION OF THE EMBODIMENTS

In the following, embodiments for embodying the present invention are explained with reference to the drawings. However, configurations described in the embodiments are merely exemplary and are not intended to limit the scope of the present invention thereto.

First Embodiment

Figure 1:
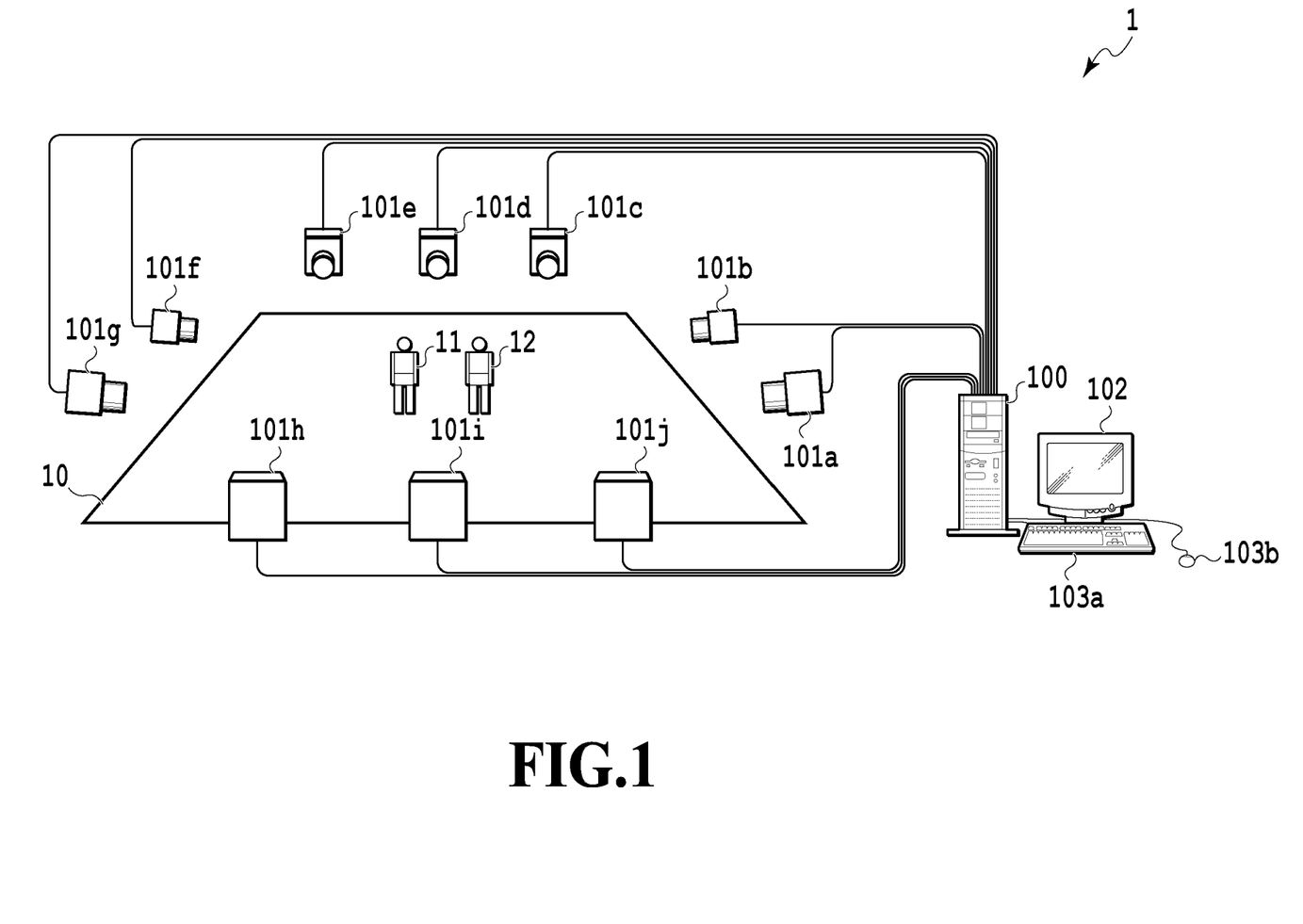
FIG. 1 is a diagram showing a configuration example of an image processing system according to a first embodiment.

First, a configuration example of an image processing system 1 according to the present embodiment is explained with reference to FIG. 1. As shown in FIG. 1, each of cameras 101a to 101j is a camera that captures a moving image and arranged facing a field 10 around the field 10, such as an athletic stadium. An image group making up a moving image captured by each of the cameras 101a to 101j is sent out to an image processing apparatus 100. As shown in FIG. 1, in the present embodiment, an example is shown in which persons 11 and 12 moving on the field 10 are objects that are captured by the cameras 101a to 101j.

First, the image processing apparatus 100 extracts a contour of an object from the image group sent out from each of the cameras 101a to 101j. Next, the image processing apparatus 100 generates a three-dimensional shape model of the object by using the extracted contour. That is, it is possible for the image processing apparatus 100 to generate a three-dimensional shape model at each time of image capturing of an object included in the image. This three-dimensional shape model is made up of, for example, a point cloud (voxel) on an object. In the case where a plurality of objects is included in an image, the three-dimensional shape model is generated for each object. The technique to acquire a point cloud on an object from the contour of the object included in an image group is publicly known in the field of the image processing technique, and therefore, explanation relating to this technique is omitted. The method of acquiring a three-dimensional shape model of an object is not limited to the above-described method. Further, the three-dimensional shape model may be represented by using a form other than a point cloud, such as polygon.

It is possible for a display device 102 to display various kinds of information, such as a three-dimensional shape model generated by the image processing apparatus 100. A keyboard 103a and a mouse 103b are an example of a user interface that a user operates for inputting various instructions and information to the image processing apparatus 100. The system configuration shown in FIG. 1 is merely exemplary, and for example, the number of cameras, the position at which the camera gases, the network configuration between the camera and the image processing apparatus 100, and so on are not limited to the system configuration shown in FIG. 1.

Figure 2:
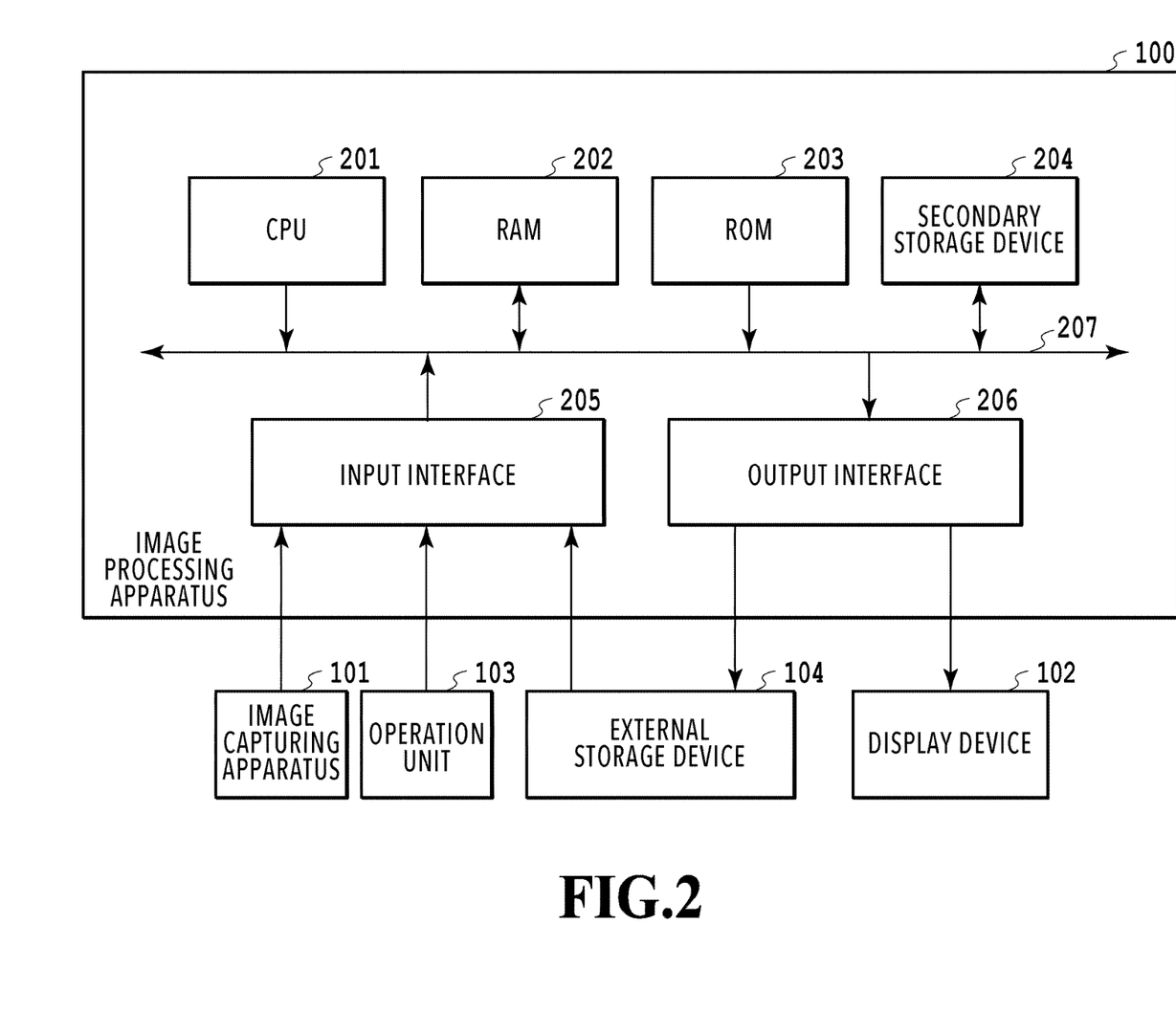
FIG. 2 is a diagram showing a hardware configuration example of an image processing apparatus according to the first embodiment.

Next, a hardware configuration example of the image processing apparatus 100 is explained by using the block diagram in FIG. 2. A CPU 201 performs various kinds of processing by using computer programs and data stored in a storage area, such as a RAM 202 and a ROM 203. Due to this, the CPU 201 performs operation control of the entire image processing apparatus 100. The RAM 202 has an area for storing computer programs and data loaded from a secondary storage device 204, an external storage device 104, the ROM 203 and so on. Further, the RAM 202 has a work area used at the time of the CPU 201 performing and controlling the various kinds of processing. As described above, it is possible for the RAM 202 to appropriately provide various work areas. In the ROM 203, setting data that does not need to be rewritten, computer programs, and so on are stored. The secondary storage device 204 is a large-capacity information storage device represented by a hard disk drive device. In the secondary storage device 204, an OS (Operating System), computer programs for causing the CPU 201 to perform each piece of processing, to be described later, and data are stored. The computer programs and data stored in the secondary storage device 204 are appropriately loaded onto the RAM 202 in accordance with control by the CPU 201 and are taken to be a processing target by the CPU 201. The operation unit 103 includes the keyboard 103a and the mouse 103b described above and is capable of receiving the operation by a user and sending out various instructions to the CPU 201 via an input interface 205. In the block diagram in FIG. 2, the image capturing apparatus 101 corresponds to the above-described cameras 101a to 101j. Consequently, in the following explanation, the image group of interest that is output from the image capturing apparatus 101 means the image group of interest that is output from the cameras 101a to 101j, respectively. The image group that is output from the image capturing apparatus 101 is stored in the RAM 202 and the secondary storage device 204. The image group stored in the RAM 202 and the secondary storage device 204 is used for processing by a position prediction unit 303, to be described later. The external storage device 104 performs reading and writing of computer programs and data for the storage media, such as CD-RW and DVD-RW. The computer programs and data read from the storage media by the external storage device 104 are sent out to the RAM 202 and the secondary storage device 204 via the input interface 205. On the other hand, the computer programs and data that are written to the storage media by the external storage device 104 are sent out from the RAM 202 and the secondary storage device 204 to the external storage device 104 via an output interface 206. Further, it may also be possible to store the computer programs and data that are explained as those stored in the secondary storage device 204 in the storage media and to read the computer programs and data onto the RAM 202 and the secondary storage device 204 from the storage media by the external storage device 104. The display device 102 includes a CRT and a liquid crystal screen and displays the processing results by the CPU 201 by images, characters, and so on. It may also be possible to constitute a touch panel screen by integrating the operation unit 103 and the display device 102 into one unit. Then, the CPU 201, the RAM 202, the ROM 203, the secondary storage device 204, the input interface 205, and the output interface 206 are each connected to one another so as to be capable of communication via a bus 207.

Figure 3:
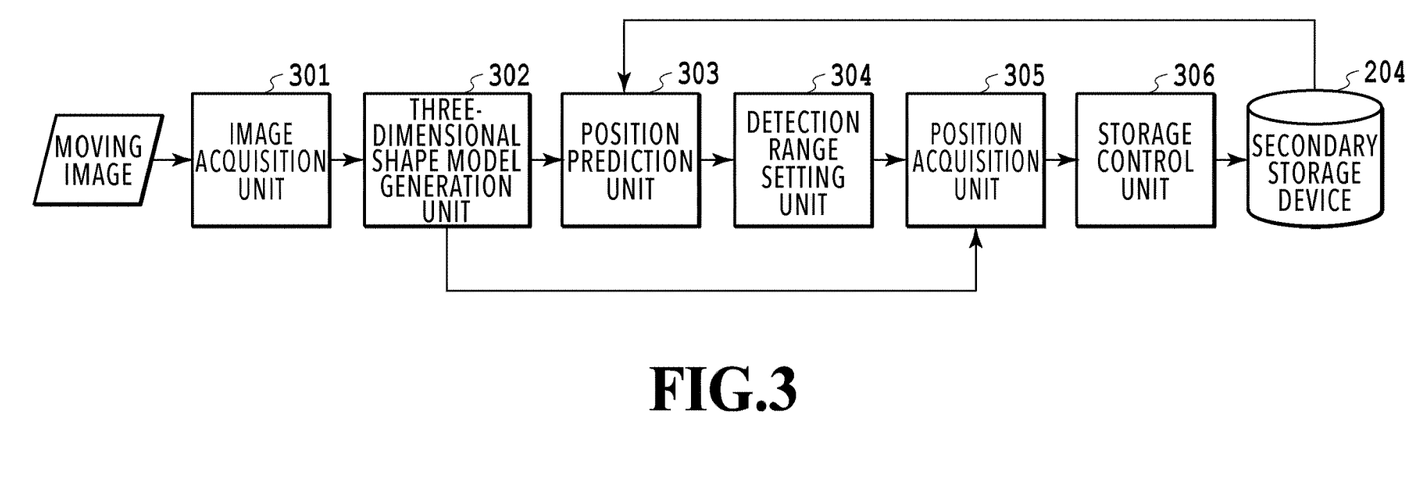
FIG. 3 is a block diagram showing a function configuration example of the image processing apparatus according to the first embodiment.
Figure 4:
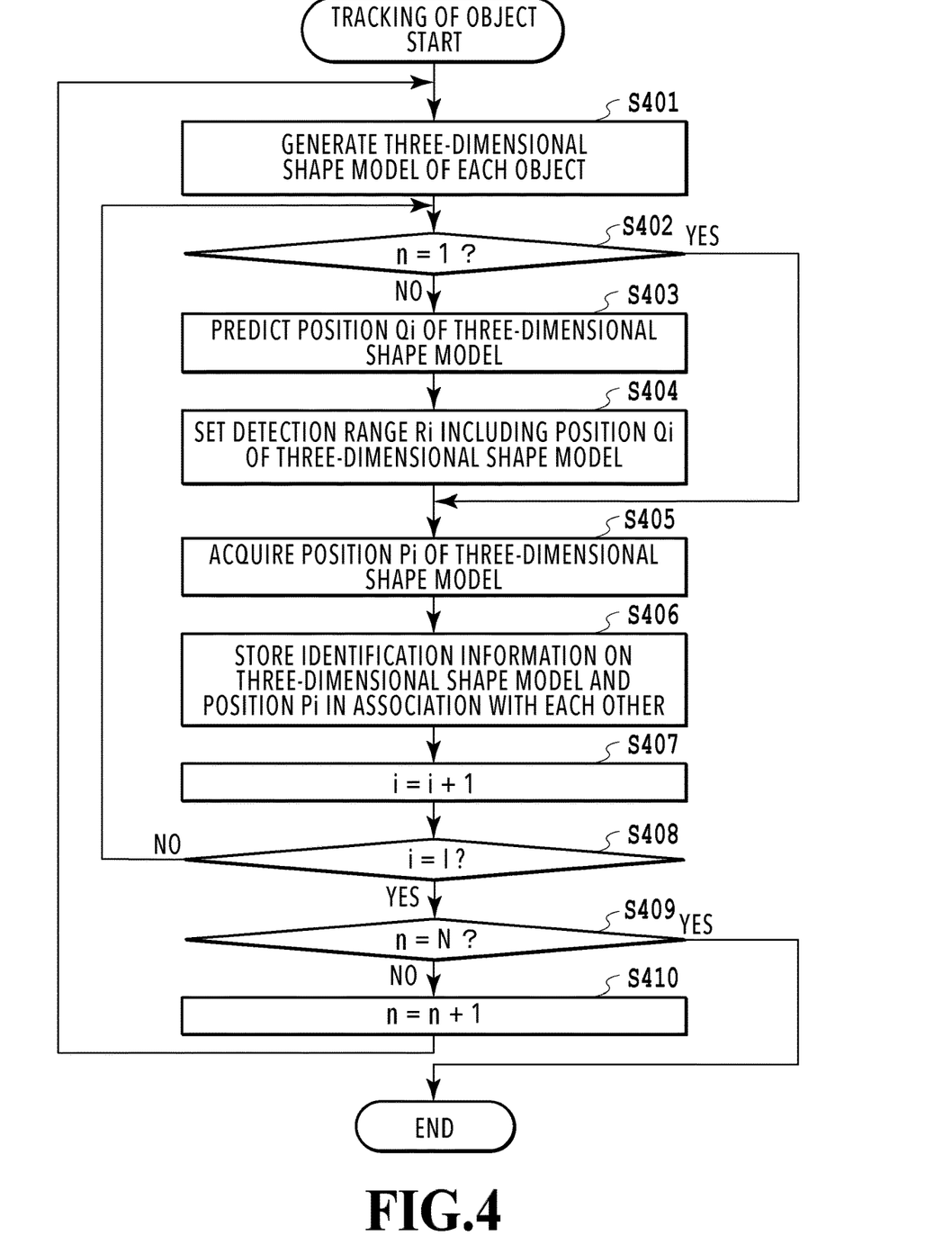
FIG. 4 is a flowchart showing a tracking procedure example of an object according to the first embodiment.

FIG. 3 is a block diagram showing a function configuration example of the image processing apparatus 100 according to the present embodiment. FIG. 4 is a flowchart showing a processing procedure example of an object of the image processing apparatus 100 according to the present embodiment. In the following, with reference to the block diagram in FIG. 3 and the flowchart in FIG. 4, a tracking procedure example of an object according to the present embodiment is explained. The processing of each block shown in FIG. 3 and the processing of the flowchart shown in FIG. 4 are performed by the CPU 201 loading program codes stored in the ROM 203 and the like onto the RAM 202 and executing the program codes. Each symbol S below means that the step is a step in the flowchart. This is also the same with the flowchart in FIG. 7.

At S401, a three-dimensional shape model generation unit 302 generates a three-dimensional shape model of an object included in an image group acquired by an image acquisition unit 301 from the image capturing apparatus 101. In the following, three-dimensional shape models generated at S401 are described as M (1), M (2), . . . , M (i), . . . , M (I). Here, i is a variable indicating the number of three-dimensional shape models and I indicates the total number of three-dimensional shape models generated at S401. In the case where the variable i≠1, the value of the variable i is initialized to "1" before the processing at S401 is performed.

At S402, whether or not the three-dimensional shape models M (1) . . . M (I) generated at S401 are generated from the first image is determined (n=1? at S402 in FIG. 4). Here, n is a variable indicating the time (what number image) in the length (time) of a moving image input to the image processing apparatus 100 and N (used for determination of n=N? at S409 in FIG. 4) indicates the total number of images making up the above-described moving image. In the case where n≠1 (S402: NO), the processing advances to S403. On the other hand, in the case where n=1 (S402: Yes), S403 and S404 are skipped and the processing advances to S405. In the case where the variable n≠1 at the time of the flowchart in FIG. 4 being started, the value of the variable n is initialized to "1" before the processing at S401 is performed.

At S403, the position prediction unit 303 predicts a position Qi (n) of the three-dimensional shape model M (i) at time n. A specific prediction procedure example is as follows. First, the position prediction unit 303 reads the three-dimensional position and a velocity vector of the three-dimensional shape model M (i) at time n−1 (first time), which is the preceding image, from a storage area, such as the secondary storage device 204. Next, the position prediction unit 303 determines the coordinates of the predicted position Qi (n) of the three-dimensional shape model at time n based on the information. Hereinafter, one or a plurality of the RAM 202, the secondary storage device 204, and the external storage device 104 in which the position information on the three-dimensional shape model M (i) and the velocity vector information necessary for the above-described prediction are stored is described simply as a "storage area".

In the following, for simplification of explanation, an example is explained in which the coordinates of the predicted position Qi (n) of the three-dimensional shape model at time n are determined from three-dimensional coordinates Pi (n−1) and a three-dimensional velocity vector Vi (n−1) of the three-dimensional shape model M (i) at time n−1. The predicted position Qi (n) and the velocity vector Vi (n) are calculated by using (expression 1) and (expression 2) below.

$$Qi(n)=Pi(n-1)+\Delta t \cdot Vi(n-1) \quad \text{(expression 1)}$$

$$Vi(n)=[Pi(n)-Pi(n-1)]/\Delta t \quad \text{(expression 2)}$$

In (expression 1) and (expression 2) described above, $\Delta t$ indicates the time corresponding to one image making up a moving image. For example, in the case of a moving image at 60 fps, $\Delta t = 1/60$ sec. The determination method of the predicted position Qi (n) is not limited to (expression 1) described above and information before time n−1 may be used or high-order information, such as acceleration, may be used. Further, the predicted position Qi (n) may be calculated based on a motion model.

At S404, a detection area setting unit 304 sets a detection area Ri (n) including the predicted position Qi (n) predicted at S403. The setting method of the detection area Ri (n) of the three-dimensional shape model M (i) at time n will be described later.

At S405, a position acquisition unit 305 performs processing to detect the position Pi (n) of the three-dimensional shape model M (i) for the detection area Ri (n). That is, the position acquisition unit 305 specifies the detection area Ri (n) for the processing of the three-dimensional shape model of an object at time n (second time) based on the position information on the object at time n−1 (first time). As described above, the three-dimensional shape model in the present embodiment is made up of a point cloud. Because of this, it is possible for the position acquisition unit 305 to find the position of the center of gravity from the position relationship between points making up the point cloud and to take the position of the center of gravity as the position of the three-dimensional shape model. It is possible to acquire the position of the point cloud from the positions of the cameras 101a to 101j, the focal lengths thereof, and so on. That is, the detection area Ri is set as the area in which the coordinates corresponding to the above-described position of the center of gravity are searched for. However, it may also be possible to take the position of the three-dimensional shape model to be a position other than the center of gravity (in the case of the three-dimensional shape model of a person, for example, the center of the head and the like).

The position acquisition unit 305 acquires the three-dimensional coordinates corresponding to the position of the center of gravity of the point cloud included in the detection area Ri (n) set at S404 of the point clouds making up the three-dimensional shape model M (i) as the position Pi (n) of the three-dimensional shape model M (i). The position acquisition unit 305 does not necessarily need to derive the position of the center of gravity from all the point clouds included in the detection area Ri. For example, the detection area Ri is divided into a plurality of cubes and the coordinates of the cube that includes the largest number of points or voxels making up the three-dimensional shape model may be acquired as the position Pi. Further, in the case where it is determined that n=1 at S402 (S402: YES), the detection area Ri is not set, and therefore, the three-dimensional coordinates corresponding to the position of the center of gravity of the point cloud making up the three-dimensional shape model M (i) are acquired as the position Pi of the three-dimensional shape model M (i). In this case also, the position acquisition unit 305 does not necessarily need to derive the position of the center of gravity from all the point clouds. For example, the three-dimensional coordinates corresponding to the position of the center of gravity of the point cloud corresponding to the heads of the persons 11 and 12 of the point clouds making up the three-dimensional shape model M (i) may be acquired as the position Pi.

At S406, a storage control unit 306 stores identification information on the three-dimensional shape model M (i) and the position Pi (n) in the storage area in association with each other. The above-described identification information is an identifier used for uniquely identifying the three-dimensional shape model M (i). By the processing at S406, it is possible for the position prediction unit 303 of the present embodiment to read the position Pi of the corresponding three-dimensional shape model M (i) from the storage area based on the identification information. In other words, by the processing at S406, a person A before time n−1 and the person A at time n are associated with each other.

At S407, the variable i is incremented by 1. Then, at S408, whether or not the processing of all the three-dimensional shape models M (i) at time n has been completed is determined. That is, in the case where i=I (S408: YES), the processing advances to S409. On the other hand, in the case where i<I (S408: NO), the processing returns to S402 again and the processing at S402 to S408 is repeated for the unprocessed three-dimensional shape model M (i).

At S409, whether or not the processing has been completed for all the images is determined. That is, in the case where n=N (S409: YES), the processing of this flowchart is terminated. On the other hand, in the case where n≠N (S409: NO), the processing advances to S410. Then, at step S410, the variable n is incremented by 1, the processing returns to S401 again, and the processing at S401 to S409 is repeated for the next image group acquired by the image acquisition unit 301.

Figure 5:
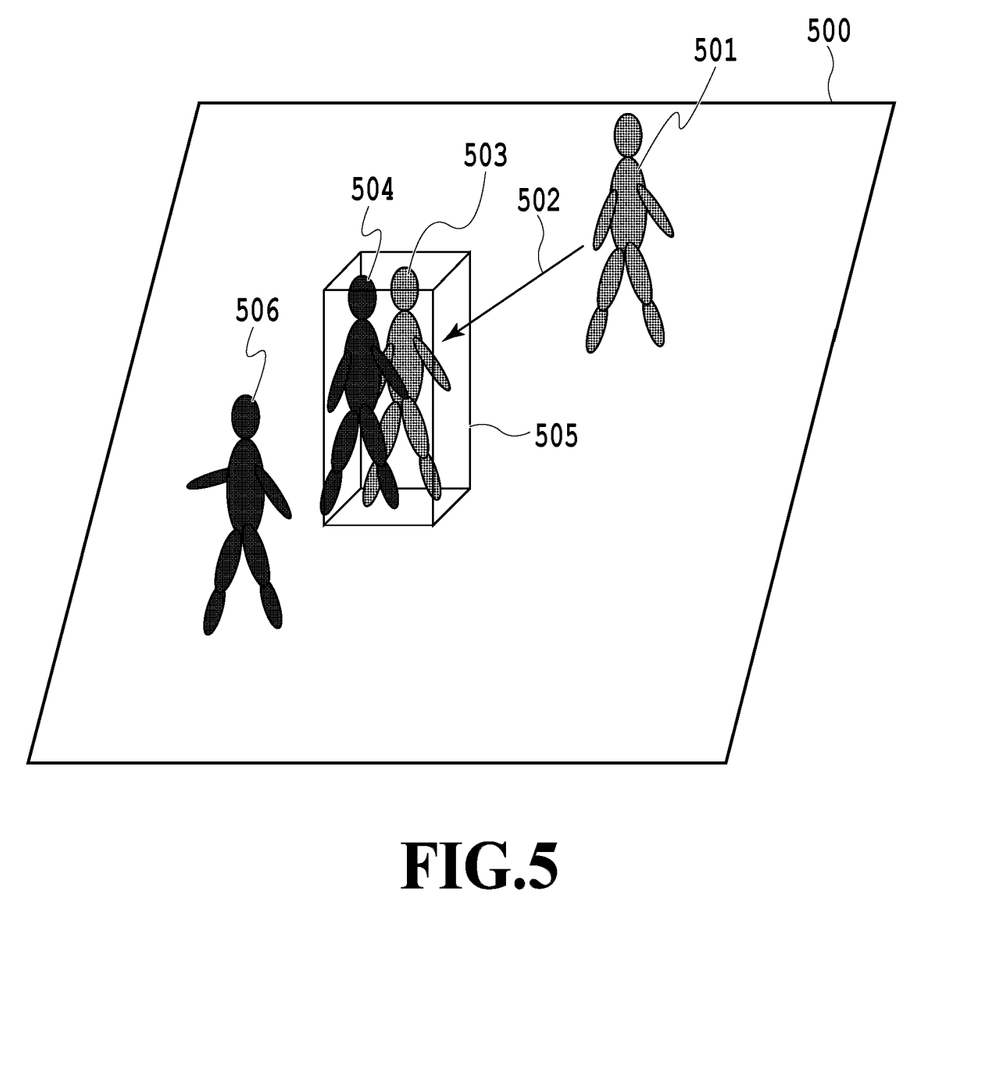
FIG. 5 is a conceptual image showing a setting procedure example of a detection area according to the first embodiment.

Next, the setting method of the detection area Ri (S403) is explained in detail with reference to FIG. 5 and FIG. 6. FIG. 5 is a conceptual diagram showing a setting procedure example of a detection area in the present embodiment. In FIG. 5, an extension of a three-dimensional space is indicated by symbol 500 schematically. Then, the three-dimensional shape model M (i) at time n−1 is indicated by symbol 501 and the velocity vector Vi (n−1) at time n−1 is indicated by symbol 502. The predicted position Qi (n) of the three-dimensional shape model M (i) predicted at time n is indicated by symbol 503 and the actual position Pi (n) of the three-dimensional shape model M (i) at time n is indicated by symbol 504. Further, as shown in FIG. 5, the detection area Ri (n) is indicated by symbol 505. Furthermore, a position Pj (n) of a j-th three-dimensional shape model M (j) different from the three-dimensional shape model M (i) 504 at time n is indicated by symbol 506. As shown in FIG. 5, at time n, the three-dimensional shape model M (i) 504 and the three-dimensional shape model M (j) 506 are close to each other within the three-dimensional coordinate system.

Generally, in the case where a person changes the direction or suddenly begins to move, it is difficult for the person to accelerate quickly. Because of this, in the case where the image capturing apparatus 101 captures the persons 11 and 12 and an object (person) is extracted from the captured image group, the prediction accuracy of the position of the object such as this is unlikely to deteriorate so much. In the present embodiment, with the predicted position Qi (n) being as the center, a cuboid having a size just including the three-dimensional shape model M (i) 501 is set as the detection area Ri (n). For example, in the case where an object represents a person, on a condition that a cuboid whose length is about 0.6 m, whose width is about 0.6 m, and whose height is about 2.0 m is set as the detection area Ri, it is almost possible to include the object in this detection area Ri. By the detection area Ri having the size as described above being set, for example, it becomes more difficult for the three-dimensional shape model M (i) 506 to be included in the detection area Ri (n) 505 of the three-dimensional shape model M (i) 504. Then, it is possible to reduce the possibility that persons who are not identical are erroneously associated with each other. That is, it is possible to perform tracking processing of a person with a high accuracy. Further, the image processing apparatus 100 of the present embodiment performs processing to detect the position Pi (n) of the three-dimensional shape model M (i) by limiting the detection area to the detection area Ri (n). That is, the image processing apparatus 100 specifies the processing area relating to the three-dimensional shape model of the object at time n (second time) based on the position information on the object at time n−1 (first time). Due to this, it is possible to implement processing to associate objects with each other with a processing load lighter than that in the case where detection processing is performed for the entire three-dimensional space. The size of the detection area Ri (n) is not limited to the above-described example. Further, it may also be possible to set a different value to the detection area Ri (n) in accordance with the size of a person, the moving speed, the degree of density of persons, and so on.

Figure 6:
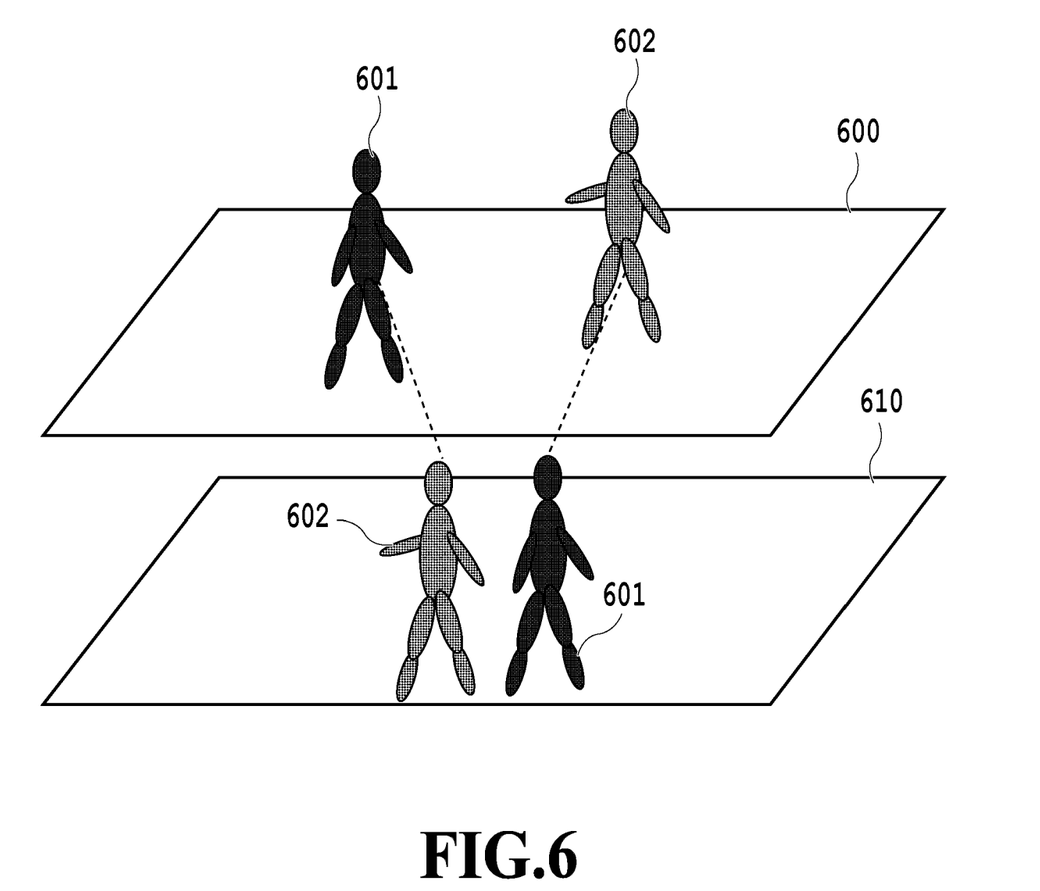
FIG. 6 is a schematic diagram showing an example of a case where a three-dimensional shape model is tracked erroneously in the first embodiment.

FIG. 6 is a schematic diagram showing an example in the case where a three-dimensional shape model different from the three-dimensional shape model that should originally be tracked is tracked erroneously.

In FIG. 6, an extension 600 of the three-dimensional space at time n and an extension 610 of the three-dimensional space at time n+1 are shown schematically. Further, FIG. 6A shows the way the three-dimensional shape model M (i) 601 and the three-dimensional shape model M (i) 602 pass each other as time elapses from time n to time n+1. At this time, in the case where the three-dimensional shape models M 601 and 602 approach each other, on a condition that the detection area is set to a size that includes the three-dimensional shape models M 601 and 602, there is a possibility that the three-dimensional shape model different from the three-dimensional shape model that should originally be tracked is tracked erroneously. In FIG. 6, at time n+1, the three-dimensional shape model M (j) 602 that approaches the three-dimensional shape model M (i) 601 is tracked erroneously.

Further, in the case where the persons 11 and 12 jump, there is a case where the height position of the object changes. In such a case also, the tracking method of an object of the present embodiment is effective. That is, the image processing apparatus 100 of the present embodiment sets the detection area based on the predicted position of the object in the three-dimensional coordinate space and the size of the object, and therefore, it is possible to track the object in the direction of the height in which the persons 11 and 12 jump.

As explained above, the image processing apparatus of the present embodiment specifies the processing area relating to the three-dimensional shape model of the object at time n (second time) based on the position information on the object at the time n−1 (first time). Due to this, it is possible to track the three-dimensional position of the object at low calculation cost and with a high accuracy.

For simplification of explanation, explanation is given by mainly taking the case as an example where the position information on an object in the past (at time n−1) is used for tracking processing of the object, but the use of the position information in the past is not limited to tracking processing. As another use, for example, it is possible to use the position information on an object at time n−1 in the case where detection processing is performed for detecting an object for which a three-dimensional shape model is generated from the image at time n. By this also, it is possible to reduce calculation cost. For example, as explained at S403 in FIG. 4, the predicted position Qi (n) of the person A is found from the three-dimensional coordinates Pi (n−1) of the person A at time n−1 and the three-dimensional velocity vector Vi (n−1), and the detection area Ri (n) is found from the predicted position Qi (n). Consequently, it is possible to set the detection area for detecting the person A from the image obtained by image capturing of the cameras 101a to 101j based on the detection area Ri (n). In this case, the processing at S401 is performed, for example, at timing between S402 and S403. That is, the three-dimensional shape model generation unit 302 specifies the detection area for detecting the object from one or a plurality of images based on image capturing at time n (second time) based on the position information on the three-dimensional space of the object at time n−1 (first time). Then, the three-dimensional shape model generation unit 302 detects the object by performing detection processing for the specified detection area and generates the three-dimensional shape model of the object. As described above, by limiting the processing area for detection of an object by using information on the predicted position Qi (n) and the detection area Ri (n), it is possible to reduce calculation cost while maintaining detection accuracy.

The detection area Ri (n) may be information indicating an area on a three-dimensional space, but may also be information indicating an area on a two-dimensional space. It is possible to obtain the detection area Ri (n) indicating an area on a two-dimensional space based on the association between the position information on the detection area Ri (n) in the three-dimensional space and the position within each image capturing area of each of the cameras 101a to 101j. More specifically, by projecting each of a plurality of coordinates indicating the detection area Ri (n) on the three-dimensional space on each image of each of the cameras 101a to 101j, information indicating the area of the detection area Ri (n) on each image is obtained.

Further, for example, it may also be possible to specify the detection area for detecting the person A from the captured image at time n by the camera 101a based on the position information on the person A found from the captured image at time n−1 by the camera 101a. That is, it is possible for the three-dimensional shape model generation unit 302 of the present embodiment to specify the processing area for detecting an object from the image associated with time n (second time) based on the position information on an object within the image associated with time n−1 (first time). Then, the three-dimensional shape model generation unit 302 performs detection processing for detecting an object for the specified processing area of a plurality of images associated with time n (a plurality of images captured at time n by the cameras 101a to 101j). Then, the three-dimensional shape model generation unit 302 generates a three-dimensional shape model of an object at time n based on the image of the object detected from each of the plurality of images by the detection processing. The explanation of this paragraph can also be applied to the following embodiments.

Second Embodiment

In the first embodiment, the example is mainly explained in which the detection area Ri is set based on the predicted position Qi of an object and the size of the object. In contrast to this, in a tracking method of an object of the present embodiment, it is made possible to dynamically change the detection area Ri for each image. Due to this, it is possible for the image processing apparatus of the present embodiment to track the three-dimensional position of an object with a high accuracy while suppressing a tracking error of an object. In the following, the tracking method of an object in the present embodiment is explained. Explanation of the portions in common to those of the first embodiment is simplified or omitted and in the following, points unique to the present embodiment are explained mainly.

Figure 7:
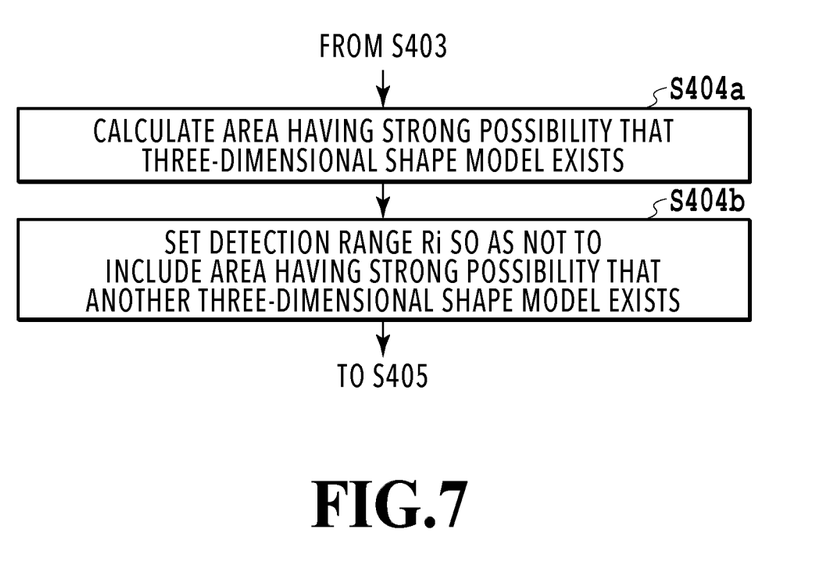
FIG. 7 is a flowchart showing a setting procedure example of a detection area according to a second embodiment.

FIG. 7 is a flowchart showing a setting procedure of the detection area Ri according to the present embodiment. In the present embodiment, in place of S404 in the flowchart in FIG. 4, processing at S404a and S404b shown in FIG. 7 is performed. In the following, with reference to FIG. 7, the setting procedure of the detection area Ri in the present embodiment is explained.

Figure 8A:
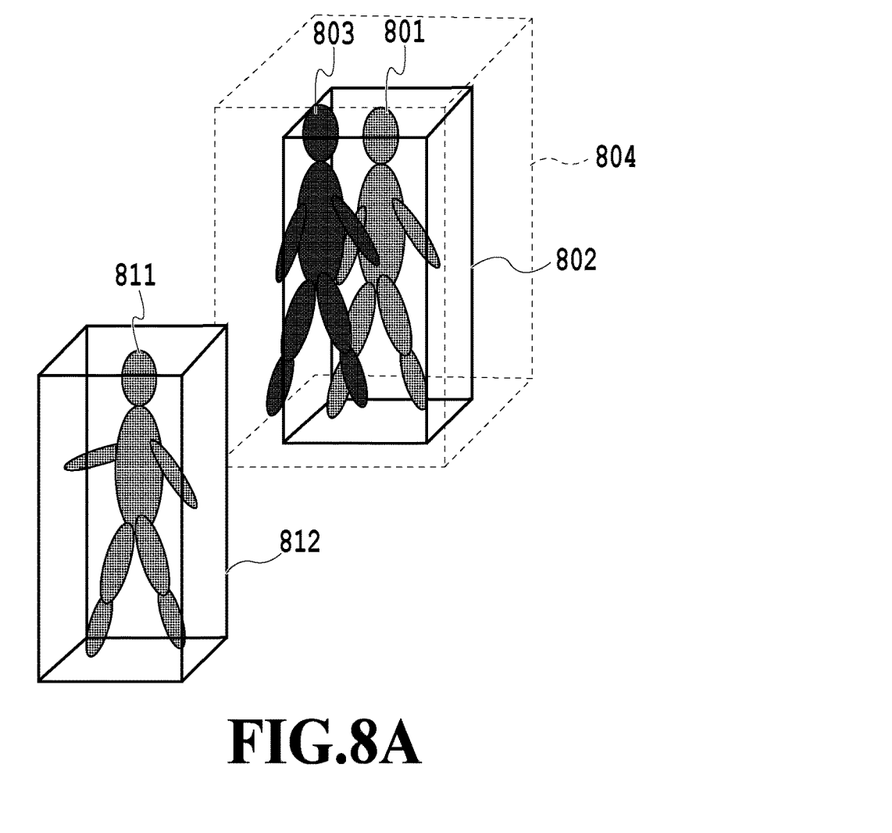
FIG. 8A and FIG. 8B are schematic diagrams showing an example of a detection area according to the second embodiment.
Figure 8B:
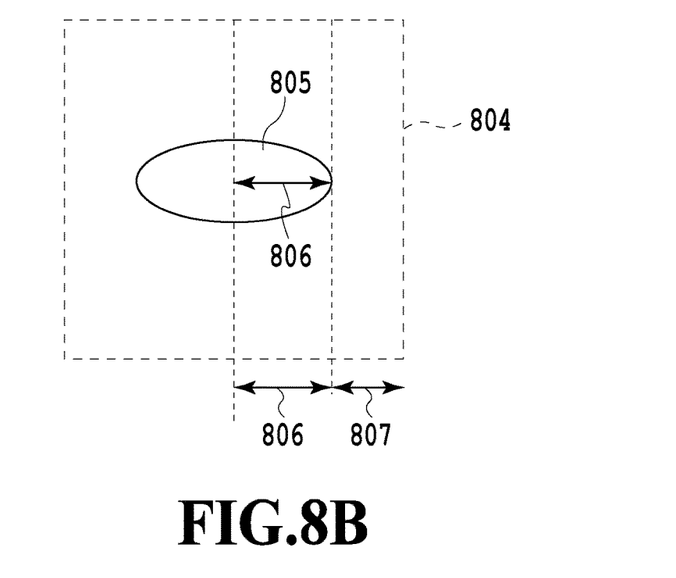

At S404a, the detection area setting unit 304 specifies an area having a strong possibility that the three-dimensional shape model M (i) exists based on the predicted position Qi (n) of the three-dimensional shape model M (i) at time n. For example, as explained in the first embodiment, it is possible for the detection area setting unit 304 to specify a cuboid including the size of an average three-dimensional shape model M with the predicted position Qi (n) being as the center as a predicted area having a strong possibility that an object exists. FIG. 8A and FIG. 8B are diagrams showing a predicted area having a strong possibility that the three-dimensional shape model M (i) exits in the present embodiment. As described above, the CPU 201 performs processing to predict an area having a strong possibility that the three-dimensional shape model M (i) exists at S404a.

In FIG. 8A, the predicted position Qi of the three-dimensional shape model M (i) is indicated by symbol 801 and a predicted position Qj of another three-dimensional shape model M (j) different from the three-dimensional shape model M (i) is indicated by symbol 811, respectively. Further, a predicted area having a strong possibility that the three-dimensional shape model M (i) exists is indicated by symbol 802 and a predicted area having a strong possibility that the three-dimensional shape model M (j) exists is indicated by symbol 812, respectively. Then, in FIG. 8A, the actual position of the three-dimensional shape model M (i) at time n is indicated by symbol 803.

At S404b, the detection area setting unit 304 sets the detection area Ri of the three-dimensional shape model M (i) so as not to include the predicted area 812 having a strong possibility that the three-dimensional shape model M (j) exists. In FIG. 8A, the detection area Ri set at S404b is indicated by symbol 804. In the present embodiment, the detection area Ri 804 is set as an area larger than the predicted area 802 having a strong possibility that the three-dimensional shape model M (i) exists in the area not including the predicted area 812 having a strong possibility that the three-dimensional shape model M (j) exists. In this case, there is an upper limit to the size of the detection area Ri 804 and this upper limit is specified by, for example, the size of the three-dimensional shape model M (i) and the area in which the position of the center of gravity can move.

FIG. 8B is a plan diagram showing the maximum size of the detection area Ri 804. In FIG. 8B, an ellipse 805 existing within the detection area Ri 804 represents a section in the vicinity of the abdominal region of the persons 11 and 12 reproduced by the three-dimensional shape model M (i). In the present embodiment, the detection area Ri 804 is defined by a square, but the shape by which the detection area Ri 804 is defined is not limited to a square. In the detection area Ri 804 in FIG. 8B, symbol 806 indicates the length of the major axis of the ellipse 805 and symbol 807 indicates the distance that the three-dimensional shape model M (i) can move in one image, respectively. For example, in the case where the image capturing apparatus 101 captures the persons 11 and 12 at 60 fps, the maximum moving speed of the person is about 10 m/sec, and therefore, the movable distance in the direction of the plane per image is about 0.2 m. In FIG. 8B, in the case where the length of the major axis of the ellipse 805 is taken to be 0.3 m and the movable distance 807 of the three-dimensional shape model M (i) (ellipse 805) is taken to be 0.2 m, the length of one side of the detection area Ri 804 is $2\times(0.2+0.3)=1.0$ m. In the above, the method of determining the size in the direction of the plane of the detection area Ri 804 is explained, but it is also possible to determine the size in the direction of the height of the detection area Ri 804 by a similar method. That is, based on the height of a person, which is an object, and the height that a person can reach by jumping, it is possible to determine the size in the direction of the height of the detection area Ri 804.

As explained above, according to the present embodiment, it is possible to dynamically change the detection area for each image. Because of this, it is possible for the image processing apparatus of the present embodiment to track the three-dimensional position of an object at low calculation cost and with a higher accuracy.

Third Embodiment

Next, an aspect is explained as a third embodiment in which it is possible to track the three-dimensional position of an object with a high accuracy while suppressing a tracking error of the object by rotating the detection area Ri in accordance with the inclination of the axis of the object. Explanation of the portions in common to those of the first and second embodiments is simplified or omitted and in the following, points unique to the present embodiment are explained mainly.

Figure 9:
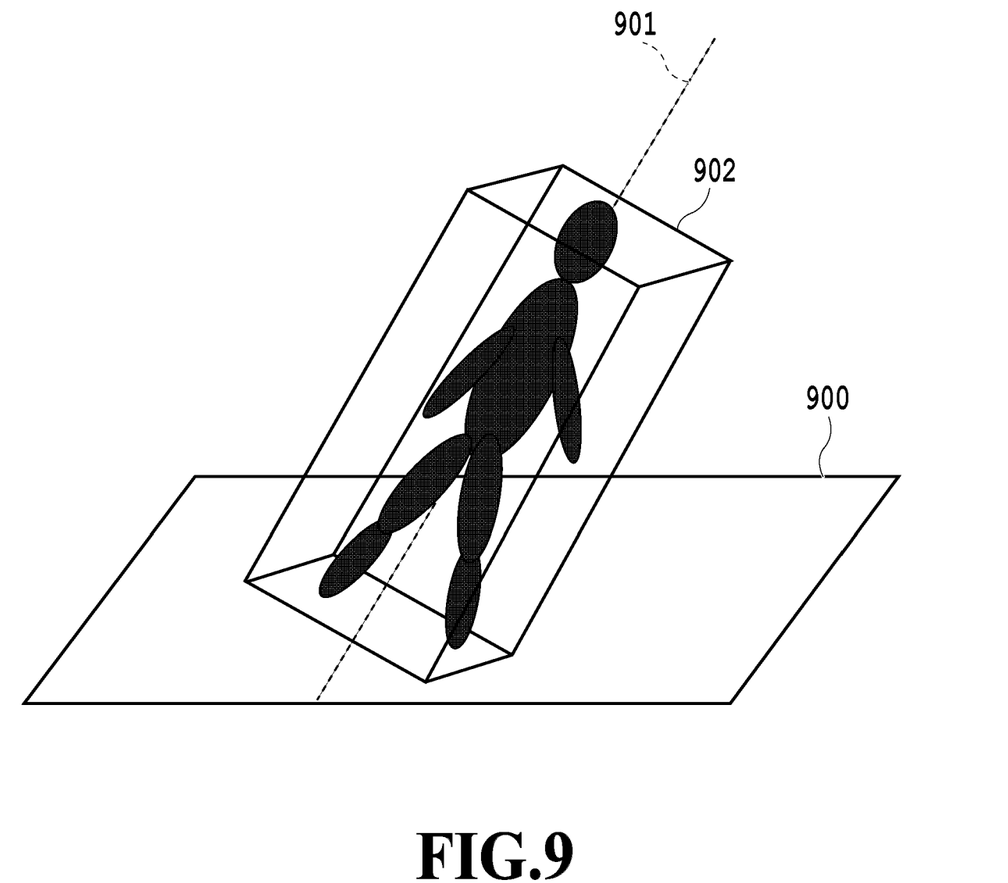
FIG. 9 is a conceptual diagram showing a setting procedure example of a detection area according to a third embodiment.

FIG. 9 is a conceptual diagram showing a setting procedure example of a detection area in the present embodiment. In FIG. 9, an extension of a three-dimensional space at time n is indicated schematically by symbol 900. Further, in FIG. 9, the detection area Ri (n) rotated based on the inclination of an axis 901 of the three-dimensional shape model M (i) is indicated by symbol 902. It may also be possible to acquire the axis 901 of the three-dimensional shape model M (i) by fitting a three-dimensional shape model M_pre (i) acquired in advance before performing tracking processing of an object (FIG. 4), or to acquire the axis 901 by estimating the three-dimensional shape model M (i).

The detection area Ri is rotated in accordance with the inclination of the axis of an object as described above, and therefore, it is possible to track the three-dimensional position of an object with a high accuracy also in the case where, for example, the persons 11 and 12, who are objects, fall down.

Fourth Embodiment

It is possible for the image processing system 1 according to the first to third embodiments to track the position of an object (person) captured by the image capturing apparatus 101 and to store information on the tracked position in the storage area. The image processing system 1 such as this may be used, for example, for tracking the position of a player on the field 10 and measuring the distance traveled by the player in a game, such as soccer and rugby. For the use such as this mainly, it may also be possible for the image processing apparatus 100 to generate a three-dimensional shape model of a ball from a group of images captured by the image capturing apparatus 101 and to track the position of the three-dimensional shape model for each image. For example, the shape and the size of a ball are specified in accordance with a match played in the field 10. Because of this, it is possible for the image processing apparatus 100 to search for an image group based on the shape and the feature amount corresponding to a ball and to specify the three-dimensional position from each of the coordinates of the image group by making use of triangulation.

Further, according to the present embodiment, by changing the setting method of the detection area Ri in the flowchart in FIG. 4, it is also made possible to specify the three-dimensional position of an object corresponding to a ball. In the case where a player kicks a ball, the direction in which the ball moves changes suddenly or the ball accelerates suddenly.

Consequently, in the present embodiment, in place of S403 in the flowchart in FIG. 4, at S404, the detection area setting unit 304 sets the detection area Ri based on the movable distance of the ball and the size of the ball. For example, the radius of a soccer ball is about 0.1 m. Then, in the case where the image capturing apparatus 101 captures a soccer ball at 60 fps, the maximum moving speed of a soccer ball is about 150 km/h, and therefore, the movable distance per image is about 0.7 m. In this case, by applying the same way of thinking as in FIG. 8B, the detection area Ri may be set as the shape of a ball having a radius of 2×0.1+0.7=0.9 m.

As explained above, according to the present embodiment, by selecting a tracking method in accordance with the kind of object, it is possible to track the position of an object with a high accuracy for each kind of player or ball.

OTHER EMBODIMENTS

In the first to fourth embodiments, the embodiments are explained in which the shape defined as the detection area Ri is a cuboid or the shape of a ball. However, the shape defined as the detection area Ri is not limited to a cuboid or the shape of a ball, and it is possible to apply a shape, such as a cube, a pyramid, a cone, and a spindle shape.

Further, it is possible to implement the present invention also by processing in which a program implementing one or more functions of the above-described embodiments is supplied to a system or an apparatus via a network or a storage medium and one or more processors in a computer of the system or the apparatus read and execute the program. Furthermore, it is possible to implement the present invention also by a circuit (for example, ASIC) that implements one or more functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the image processing system explained in the above-described embodiments, the effect that it is possible to perform processing of an object at low calculation cost and with a high accuracy is obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-156480, filed Aug. 14, 2017, and No. 2018-074669, filed Apr. 9, 2018, which are hereby incorporated by reference wherein in their entirety.

What is claimed is:
1. An image processing apparatus comprising:
one or more memories storing instructions; and
one or more processors executing the instructions to:
determine, based on position information on an object at a first time which is a time to perform image capturing for generating three-dimensional shape data on the object, detection areas of the object in a plurality of images which are associated with a second time later than the first time and which are obtained based on image capturing by a plurality of image capturing apparatuses from a plurality of directions; and
generate three-dimensional shape data on the object based on images of the object detected from the determined detection areas in the plurality of images which are associated with the second time and which are obtained based on image capturing by the plurality of image capturing apparatuses from the plurality of directions.

2. The image processing apparatus according to claim 1, wherein
the detection area in the image which is associated with the second time and which is obtained based on image capturing by the image capturing apparatus from the direction is determined based on the position information on the object at the first time and a direction in which the object moves.

3. The image processing apparatus according to claim 1, wherein
the detection area is determined by projecting, on the image which is associated with the second time and which is obtained based on image capturing by the image capturing apparatus from the direction, an area including a predicted position of the object on a three-dimensional space at the second time based on the position information on the object at the first time.

4. The image processing apparatus according to claim 1, wherein
the position information on the object at the first time is information on a three-dimensional position of the object on a three-dimensional space at the first time or information on a two-dimensional position of the object in images associated with the first time.

5. The image processing apparatus according to claim 1, wherein
the detection area which is associated with the second time and which is obtained based on image capturing by the image capturing apparatus from the direction is determined using, as the position information on the object at the first time, information on a two-dimensional position of the object in an image which is associated with the first time and which is obtained based on image capturing by the image capturing apparatus from the direction.

6. The image processing apparatus according to claim 1, wherein
the one or more processors further executes the instructions to detect the object for the determined detection areas.

7. The image processing apparatus according to claim 1, wherein
the detection areas are determined further based on at least one of velocity, acceleration, and a motion model of the object at the first time.

8. The image processing apparatus according to claim 1, wherein
the object comprises at least one of a person and a ball.

9. The image processing apparatus according to claim 1, wherein
the generated three-dimensional shape data is used to generate a virtual viewpoint image.

10. An image processing apparatus comprising:
one or more memories storing instructions; and
one or more processors executing the instructions to:
determine, based on position information on a first object at a first time which is time to perform image capturing for generating three-dimensional shape data, a first processing area to perform processing relating to first three-dimensional shape data on the first object at a second time later than the first time, the first three-dimensional shape data being generated based on image capturing by a plurality of image capturing apparatuses from a plurality of directions;
determine, based on position information on a second object different from the first object at the first time, a second processing area to perform processing relating to second three-dimensional shape data on the second object at the second time later than the first time, the second three-dimensional shape data being generated based on image capturing by the plurality of image capturing apparatuses from the plurality of directions, the second processing area not overlapping with the first processing area;
perform processing relating to the first three-dimensional shape data on the first object at the second time for the determined first processing area; and
perform processing relating to the second three-dimensional shape data on the second object at the second time for the determined second processing area.

11. The image processing apparatus according to claim 10, wherein
a first detection area of the first object at the second time is determined, as the first processing area, based on the position information on the first object at the first time,
a second detection area of the second object at the second time is determined, as the second processing area, based on the position information on the second object at the first time
the processing relating to the first three-dimensional shape data on the first object at the second time for the determined first processing area comprises processing to associate the first three-dimensional shape data on the first object detected in the first detection area with identification information on the first object, and
the processing relating to the second three-dimensional shape data on the second object at the second time for the determined second processing area comprises processing to associate the second three-dimensional shape data on the second object detected in the second detection area with identification information on the second object.

12. The image processing apparatus according to claim 10, wherein
first detection areas of the first object in a plurality of images which are associated with the second time and which are obtained based on image capturing by the plurality of image capturing apparatuses from the plurality of directions is determined, as the first processing area, based on the position information on the first object at the first time,
second detection areas of the second object in the plurality of images which are associated with the second time and which are obtained based on image capturing by the plurality of image capturing apparatuses from the plurality of directions is determined, as the second processing area, based on the position information on the second object at the first time,
the processing relating to the first three-dimensional shape data on the first object at the second time for the determined first processing area comprises processing to generate three-dimensional shape data on the first object at the second time based on an image of the first object detected from the determined first detection areas in the plurality of images which are associated with the second time and which are obtained based on image capturing by the plurality of image capturing apparatuses from the plurality of directions, and
the processing relating to the second three-dimensional shape data on the second object at the second time for the determined second processing area comprises processing to generate three-dimensional shape data on the second object at the second time based on an image of the second object detected from the determined second detection areas in the plurality of images which are associated with the second time and which are obtained based on image capturing by the plurality of image capturing apparatuses from the plurality of directions.

13. An image processing apparatus comprising:
one or more memories storing instructions; and
one or more processors executing the instructions to:
  determine, based on position information on an object at a first time which is time to perform image capturing for generating three-dimensional shape data on the object and an inclination of the object, a processing area to perform processing relating to three-dimensional shape data on the object at a second time later than the first time, the three-dimensional shape data being generated based on image capturing by a plurality of image capturing apparatuses from a plurality of directions; and
  perform processing relating to the three-dimensional shape data on the object at the second time for the determined processing area.

14. The image processing apparatus according to claim 13, wherein
  a detection area of the object at the second time is determined, as the processing area, based on the position information on the object at the first time and the inclination of the object, and
  the processing relating to the three-dimensional shape data on the object at the second time for the determined processing area comprises processing to associate the three-dimensional shape data on the object detected in the detection area with identification information on the object at the first time.

15. The image processing apparatus according to claim 13, wherein
  detection areas of the object in the plurality of images, which are associated with the second time and which are obtained based on image capturing by the plurality of image capturing apparatuses from the plurality of directions, are determined, as the processing area, based on the position information on the object at the first time and the inclination of the object, and
  the processing relating to the three-dimensional shape data on the object at the second time for the determined processing area comprises processing to generate three-dimensional shape data on the object at the second time based on an image of the object detected from the determined detection areas in the plurality of images which are associated with the second time and which are obtained based on image capturing by the plurality of image capturing apparatuses from the plurality of directions.

16. An image processing method comprising:
  determining, based on position information on an object at a first time which is time to perform image capturing for generating three-dimensional shape data on the object, detection areas of the object in a plurality of images, which are associated with a second time later than the first time and which are obtained based on image capturing by a plurality of image capturing apparatuses from a plurality of directions; and
  generating three-dimensional shape data on the object, based on images of the object detected from the determined detection areas in the plurality of images which are associated with the second time and which are obtained based on image capturing by the plurality of image capturing apparatuses from the plurality of directions.

17. The image processing method according to claim 16, wherein
  the detection area in the image which is associated with the second time and which is obtained based on image capturing by the image capturing apparatus from the direction is determined based on the position information on the object at the first time and a direction in which the object moves.

18. An image processing method comprising:
  determining, based on position information on a first object at a first time which is time to perform image capturing for generating three-dimensional shape data, a first processing area to perform processing relating to first three-dimensional shape data on the first object at a second time later than the first time, the first three-dimensional shape data being generated based on image capturing by a plurality of image capturing apparatuses from a plurality of directions;
  determining, based on position information on a second object different from the first object at the first time, a second processing area to perform processing relating to second three-dimensional shape data on the second object at the second time later than the first time, the second three-dimensional shape data being generated based on image capturing by the plurality of image capturing apparatuses from the plurality of directions, the second processing area not overlapping with the first processing area;
  performing processing relating to the first three-dimensional shape data on the first object at the second time for the determined first processing area; and
  performing processing relating to the second three-dimensional shape data on the second object at the second time for the determined second processing area.

19. An image processing method comprising:
  determining, based on position information on an object at a first time which is time to perform image capturing for generating three-dimensional shape data on the object and an inclination of the object, a processing area to perform processing relating to three-dimensional shape data on the object at a second time later than the first time, the three-dimensional shape data being generated based on image capturing by a plurality of image capturing apparatuses from a plurality of directions; and
  performing processing relating to the three-dimensional shape data on the object at the second time for the determined processing area.

20. A non-transitory computer readable storage medium storing computer executable instructions for causing a computer to execute an image processing method comprising:
  determining, based on position information on an object at a first time which is time to perform image capturing for generating three-dimensional shape data on the object, detection areas of the object in a plurality of images associated with a second time later than the first time and which are obtained based on image capturing by a plurality of image capturing apparatuses from a plurality of directions; and
  generating three-dimensional shape data on the object, based on images of the object detected from the determined detection areas in the plurality of images which are associated with the second time and which are obtained based on image capturing by the plurality of image capturing apparatuses from the plurality of directions.

\* \* \* \* \*